United States Patent Office 3,215,693
Patented Nov. 2, 1965

3,215,693
1,4-DIARYL-2,6-DIIMINO-1,2,3,6-TETRAHYDRO-s-TRIAZINES
John Thomas Shaw, Middlesex, N.J., assignor to American Cyanamid Company, Stamford, Conn., a corporation of Maine
No Drawing. Filed Aug. 2, 1963, Ser. No. 299,481
2 Claims. (Cl. 260—249.9)

This invention relates to a new class of s-triazines. More particularly, it relates to the provision of 1,4-diaryl-2,6-diimino-1,2,3,6-tetrahydro-s-triazines of the Formula I:

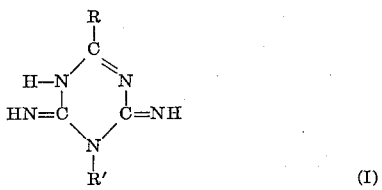

(I)

In the above formula, R and R' are aryl radicals of less than three condensed rings (i.e., phenyl, naphthyl and biphenyl) which may be substituted by 1–3 halogen (e.g., chlorine and bromine), nitro, alkyl (e.g., methyl, ethyl, dodecyl and stearyl), lower alkoxy (e.g., methoxy, ethoxy, amyloxy and hexyloxy), phenoxy, hydroxy and lower alkanoylamino (e.g., acetamido and propionamido) radicals. Salts of the above compounds with HX, where X is an anion, are also contemplated. Examples of such salt-forming groups are halide, nitrate, sulfate/2, perchlorate, cyanide, acetate, formate, thiocyanate and

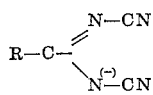

Compounds of Formula I have germicidal and fungicidal activity as demonstrated by their ability to inhibit growth of in vitro cultures of *Saccharomyces cerevisiae*, *Trichophyton mentagraphytes*, *Microsporum gypseum*, *Candida mycodema*, *Staphylococcus aureus*, *Bacillus faecilis* and *Bacillus subtilis*. By virtue of this activity, they can be used as the active components of disinfectant compositions.

The compounds of this invention can be prepared by reacting an alkali metal salt of a dicyanoamidine (II) with an aromatic primary amine (III). The reaction may be conducted under widely differing conditions.

In one modification, approximately one mole of an alkali metal salt of an N,N'-dicyanoamidine (II) is reacted with one mole of an aromatic primary amine (III) in aqueous medium and in the presence of a strong acid. The product is a salt of the s-triazine of Formula I. The salt can be converted to the s-triazine base (I) by treatment with a base such as NaOH, KOH or NH$_4$OH.

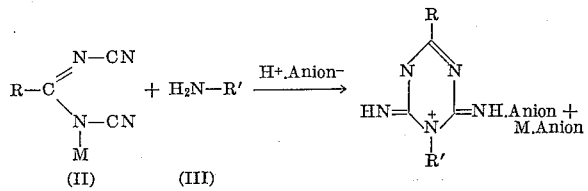

In this equation, R and R' have the meaning shown above, M is an alkali or an alkaline earth metal, and "Anion" is as defined above.

It is preferred to have between 1.0 and 1.2 moles of the primary aromatic amine per mole of N,N'-dicyanoamidine, and between 1 and 2 moles of strong acid, preferably 2 moles, per mole of N,N'-dicyanoamidine. Approximately one half of the total acid may be added initially and the remainder of the acid should be added dropwise slowly over about 15–30 minutes, or all the acid is added slowly over the 15–30 minute period. The strong acids include hydrochloric acid, sulfuric acid, nitric acid, phosphoric acid, benzenesulfonic acid, toluenesulfonic acid, etc. The aqueous medium may be water or mixtures of water and inert water-miscible liquids, such as 2-ethoxyethanol, dioxane, ethanol, etc. The temperature should be elevated, and a reaction temperature between about 50° and 90° C. is preferred. During the slow addition of the acid, the temperature is preferably between 50–60° C., but may be as high as 85–90° C. When all of the acid has been added, the reaction mixture is stirred for an additional 15–30 minutes at the same temperature until the reaction is essentially completed. After the reaction mixture is cooled, the product is isolated by filtration as the salt of the s-triazine. The free base may be obtained by suspending the salt in an excess of aqueous alkali, preferably caustic soda or caustic potash, for a short time (up to about 1 hour) at room temperature and then filtering and washing with water. The product is usually of high purity, but, if desired, it may be crystallized from a suitable solvent or otherwise purified.

In another modification, one mole of an alkali metal salt of an N,N'-dicyanoamidine (II) is reacted with a salt of an aromatic primary amine (IV) in a non-aqueous medium. The product is a salt of the s-triazine of Formula I. The salt can be converted to the s-triazine base by treatment with an alkali.

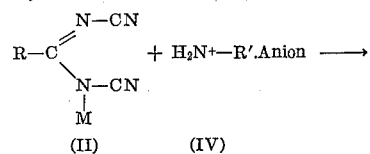

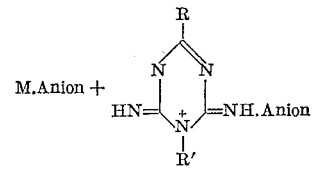

Although two moles of the amine salt per mole of N,N'-dicyanoamidine are preferred for better yields of (I), between one and two moles can be used. As solvents, there may be used inert organic liquids such as 2-ethoxyethanol, methanol, ethanol, dioxane, etc. Ambient temperatures are preferred, although slightly higher temperatures may be used.

When the reaction is finished, the product can be isolated by evaporating the solvent, preferably at ambient temperature, and slurrying the residue in a solvent for the aniline but not for the salt of the s-triazine. Suitable solvents are ether, benzene, toluene and chloroform, among others. Optionally, the s-triazine salt can be purified by crystallization from a solvent, or it can be converted to the free base as described above.

Alkali and alkaline earth metal N,N'-dicyanoamidines (II) may be prepared by several alternative methods.

In one method, an imidine is reacted with cyanogen chloride. The reaction proceeds according to the following equation:

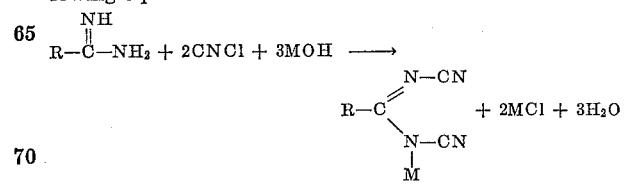

wherein R and M are as hereinbefore defined.

The reaction is carried out in an inert organic non-polar solvent such as acetone, dioxane, or acetonitrile at a temperature below about 25° C., preferably about 5° and 10° C. The proportions of reactants should be approximately equal to the theoretical amounts. Thus, about two moles of cyanogen chloride and about three equivalents of inorganic base should be used for each amidine group to be converted.

Any inorganic base may be used. Among the suitable materials are the alkali (e.g., sodium and potassium) and alkaline earth (e.g., calcium and magnesium) metal hydroxides or carbonates. Representative N,N'-dicyanoamidines whose alkali and alkaline earth metal salts may be used to prepare the s-triazines of this invention are the potassium, sodium, calcium and magnesium salts of N,N' - dicyanobenzamidine, N,N'-dicyano-p-chlorobenzamidine, N,N' - dicyano-o-chlorobenzamidine, N,N'-dicyano-p-nitrobenzamidine, N,N' - dicyano-o-toluamidine, N,N'-dicyano-p-toluamidine, N,N' - dicyano - o - methoxybenzamidine, N,N'-dicyano-alpha-naphthamidine, N,N-dicyano-beta-naphthamidine, etc.

Repersentative aromatic primary amines which may be used in the preparation of the compounds of this invention by the "aqueous" method include aniline, p-chloroaniline, m-chloroaniline, p-anisidine, p-nitroaniline, o-nitroaniline, 3,4-dichloroaniline, 3,4,5 - trichloroaniline, 3,4,5 - trimethoxyanline, p-toluidine, p-aminophenol, p-phenoxyaniline, p - phenylaniline, m - aminoacetanilide, alpha-naphthylamine, beta - naphthylamine, m-toluidine, etc.

The aromatic primary amine salts used in the alternative "non-aqueous" method can be salts of the above amines with strong mineral acids such as hydrochloric acid, sulfuric acid, nitric acid, etc.

The following examples, in which parts and percentages are by weight, are presented to further illustrate the present invention.

*Example 1.—2,6-diimino-1,4-diphenyl-1,2,3,6-tetrahydro-s-triazine*

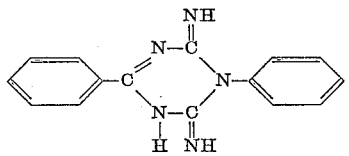

A mixture of 4.16 parts (0.02 mole) of potassium N,N'-dicyanobenzamidine, 5.17 parts (0.04 mole) of aniline hydrochloride and about 25 parts of 2-ethoxyethanol was stirred in a closed reaction vessel at ambient temperature until the reaction was essentially complete. The reaction mixture was filtered, and the filtrate was evaporated to dryness. The residue was stirred with about 90 parts of ether, and then with 100 parts of water. The aqueous solution was treated with caustic soda until a pH of 8–9 was obtained. The white precipitate was isolated by filtration, washed with water and dried. The product, amounting to about 3.2 parts, melted at 210–211° C. with decomposition.

*Example 2.—2,6-diimino-1,4-diphenyl-1,2,3,6-tetrahydro-s-triazine*

A solution of 10.4 parts (0.05 mole) of potassium N,N'-dicyanobenzamidine in 25 parts of water was treated with 5.57 parts of aniline (0.06 mole) and about one-third of an acid solution prepared by dissolving 10.5 parts of concentrated hydrochloric acid in 25 parts of water. The reaction mixture was heated to 75° C. with stirring, and the remainder of the acid was added over 25 minutes at 75–90° C. After heating for an additional 10 minutes, the reaction mixture was allowed to cool. The precipitate was stirred with 25 parts of water and about 30 parts of 5 N caustic soda solution was added in portions. After about 15 minutes, the precipitate was separated by filtration, washed with water and dried. The product is the same as the product from Example 1.

*Example 3.—1,4-bis(p-chlorophenyl)-2,6-diimino-1,2,3,6-tetrahydro-s-triazine hydrochloride*

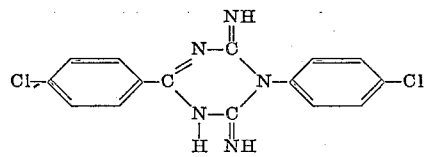

A mixture of 2.42 parts (0.01 mole) of potassium N,N'-dicyano-p-chlorobenzamidine and 3.28 parts (0.02 mole) of p-chloroaniline hydrochloride in about 15 parts of 2-ethoxyethanol was stirred in a closed container at room temperature until the reaction was essentially complete (four days). The solvent was removed by evaporation at room temperature, and the residue was recrystallized twice from water. The product melted at 260–262° C. with decomposition.

*Example 4.—4-(p-chlorophenyl)-2,6-diimino-1-(p-methoxyphenyl)-1,2,3,6-tetrahydro-s-triazine*

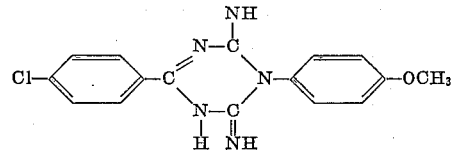

A mixture of 2.43 parts (0.01 mole) of potassium N,N' - dicyano - p - chlorobenzamidine, 3.19 parts (0.02 mole) of p-anisidine hydrochloride and 20 parts of 2-ethoxyethanol was stirred in a closed container at room temperature for about five days. The reaction mixture was filtered, and the filtrate was evaporated to dryness. The residue was stirred with about 20 parts of ether, and the insoluble material was treated with about 25 parts of water made alkaline to a pH of 10 with caustic soda solution. The insoluble material was separated by filtration, washed with water and dried. The product melted at 185–187° C. with decomposition. After recrystallization from 2-ethoxyethanol and water, the melting point was 188–190° C. with decomposition.

*Example 5.—2,6-diimino-1-(p-nitrophenyl)-4-phenyl-1,2,3,6-tetrahydro-s-triazine*

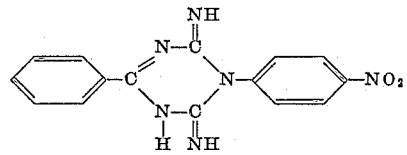

The procedure of Example 2 was repeated using 7.7 parts of p-nitroaniline in place of the aniline. The product melted at 203–205° C. with decomposition.

*Example 6.—1-(p-chlorophenyl)-2,6-diimino-4-phenyl-1,2,3,6-tetrahydro-s-triazine*

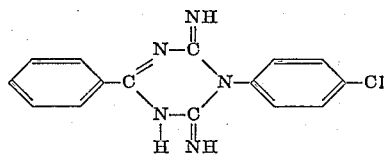

The procedure of Example 2 was followed using 7.07 parts of p-chloroaniline in place of the aniline, and the entire amount of acid solution was added over 35 minutes at a temperature of 50–75° C. The product melted at 195° C. with decomposition.

*Example 7.—1-(3,4-dichlorophenyl)-2,6-diimino-4-phenyl-1,2,3,6-tetrahydro-s-triazine*

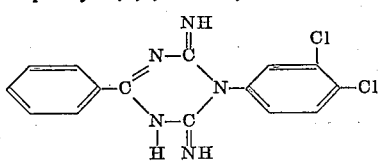

A mixture of 10.4 parts of potassium N,N'-dicyanobenzamidine, 9.0 parts (0.0555 mole) of 3,4-dichloroaniline and 35 parts of water was treated with one-third of an acid solution prepared by dissolving 10.5 parts of concentrated hydrochloric acid (0.1 mole) in 25 parts of water. The reaction mixture was heated at 55–60° C. while the remainder of the acid solution was added dropwise over 20 minutes. The heating at 55–65° C. was continued for an additional 10 minutes, followed by heating at 75–80° C. for about 30 minutes. On cooling, a ball of gummy solid material separated, and, after adding 50 parts of water, a thick precipitate was also formed. The ball was separated from the remainder of the precipitate, and the latter was collected and dried. This latter product was stirred with 75 parts of water to which about 20 parts of 3 N caustic solution was added. The precipitate was separated and dried. It was then slurried with about 35 parts of ether, and the insoluble product, after separation and drying, melted at 228° C. with decomposition.

*Example 8.—1-(p-dodecylphenyl)-2,6-diimino-4-phenyl-1,2,3,6-tetrahydro-s-triazine*

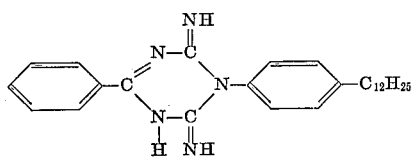

A mixture of 10.4 parts (0.05 mole) of potassium N,N'-dicyanobenzamidine, 35 parts (0.05 mole) of p-dodecylaniline and 35 parts of water was treated with about one-third of an acid solution prepared by dissolving 10.5 parts of concentrated hydrochloric acid in 25 parts of water. The reaction mixture was heated to 55–65° C., and the remainder of the acid solution was added dropwise over about 15 minutes. The heating was continued at 55–65° C. for about 15 minutes, followed by heating at 80° C. for 30 minutes. On cooling, a gummy solid separated, which was removed and washed several times by decantation with water. The solid was dissolved in about 120 parts of ethanol to which was then added about 40 parts of 3 N caustic soda solution. The resulting turbid solution was added to 300 parts of water, and the precipitate was separated, washed with water and dried. The product was stirred with about 75 parts of hexane, followed by filtration and drying. The product belted at 178–180° C.

*Example 9.—4-(p-chlorophenyl)-1-(3,4-dichlorophenyl)-2,6-diimino-1,2,3,6-tetrahydro-s-triazine*

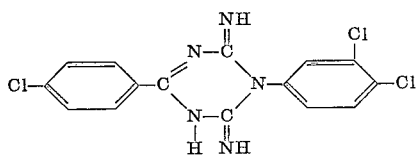

A solution of 12.1 parts (0.05 mole) of potassium N,N'-dicyano-p-chlorobenzamidine, 9 parts (0.055 mole) of 3,4-dichloroaniline in 100 parts of water and 100 parts of 2-ethoxyethanol was heated to 55° C. An acid solution prepared by dissolving 10.5 parts of concentrated hydrochloric acid in 25 parts of water was added dropwise over approximately 15 minutes at a temperature of 55–60° C. The mixture was heated for 10 minutes at 55–60° C., followed by 35 minutes at 80–85° C. After cooling, the precipitate was separated and treated with 75 parts of water and about 15 parts of 5 N sodium hydroxide at ambient temperature. The slurry was heated to 50° C., and the product was separated by filtration at this temperature. The product, after washing with 75 parts of hot water and drying, melted at 212–214° C. with decomposition.

*Example 10.—1,4-bis(p-chlorophenyl)-2,6-diimino-1,2,3,6-tetrahydro-s-triazine*

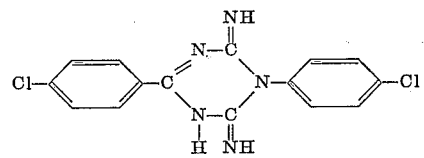

The procedure of Example 9 was repeated using 7.07 parts of p-chloroaniline in place of the 3,4-dichloroaniline. The water was increased from 100 parts to 250 parts, and the acid addition required 35 minutes. The final heating period was 25 minutes at 85–90° C. The product melted at 212–213° C. with decomposition.

*Example 11.—4-(p-chlorophenyl)-2-(p-nitrophenyl)-2,6-diimino-1,2,3,6-tetrahydro-s-triazine*

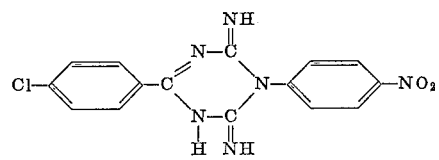

The procedure of Example 9 was repeated using 7.7 parts of p-nitroaniline in place of the 3,4-dichloroaniline. Seventy five parts each of water and 2-ethoxyethanol were used and the acid solution contained 6.3 parts of nitric acid (0.1 mole). The product melted at 245–247° C. with decomposition.

*Example 12.—1-(p-dodecylphenyl)-4-(p-chlorophenyl)-2,6-diimino-1,2,3,6-tetrahydro-s-triazine*

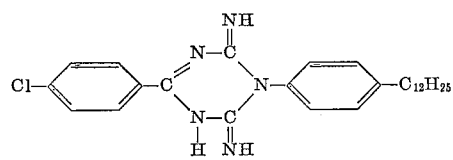

The procedure of Example 8 was followed substituting 12.1 parts of N,N'-dicyano-p-chlorobenzamidine for the N,N'-dicyanobenzamidine. The product melted at 182–183° C. with decomposition.

I claim:
1. A compound of the formula:

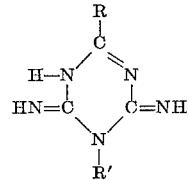

wherein R and R' are each a carbocyclic aryl radical of less than three condensed rings which may have up to three substituents selected from the group consisting of halogen, notro, alkyl of up to 18 carbon atoms, lower alkoxy, phenoxy, hydroxy and lower alkanoylamino.

2. A salt of the compound of claim 1 wherein the salt-forming group is a member selected from the group consisting of halide, nitrate, sulfate/2, perchlorate, cyanide, acetate, formate, thiocyanate and

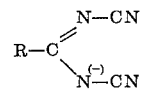

(References on following page)

References Cited by the Examiner

UNITED STATES PATENTS

| | | | |
|---|---|---|---|
| 2,344,784 | 3/44 | Oldham | 260—249.9 |
| 2,371,100 | 3/45 | Kaiser et al. | 260—564 |
| 2,437,691 | 3/48 | Grun | 260—249.9 |
| 2,665,985 | 1/54 | Sus | 260—249.9 X |
| 2,729,640 | 1/56 | Kaiser et al. | 260—249.6 |

FOREIGN PATENTS 540,156   4/47   Canada.

OTHER REFERENCES

Shapiro et al., "J.A.C.S.," vol. 79 (1957), pages 5064–5069.

Smolin et al., "s-Triazines and Derivatives," Interscience Pub. Inc., N.Y. (1959), p. 241.

WALTER A. MODANCE, *Primary Examiner.*

JOHN D. RANDOLPH, *Examiner.*